No. 737,139. Patented August 25, 1903.

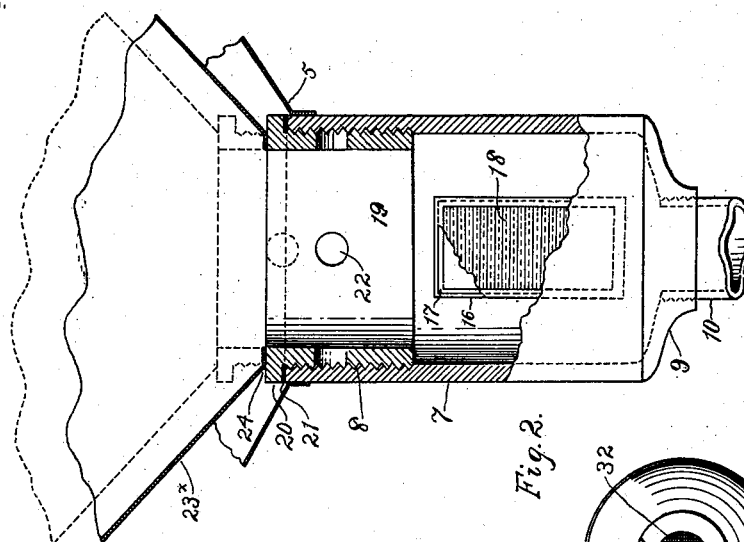
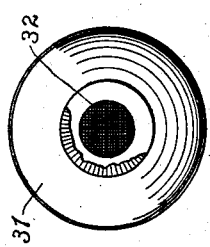
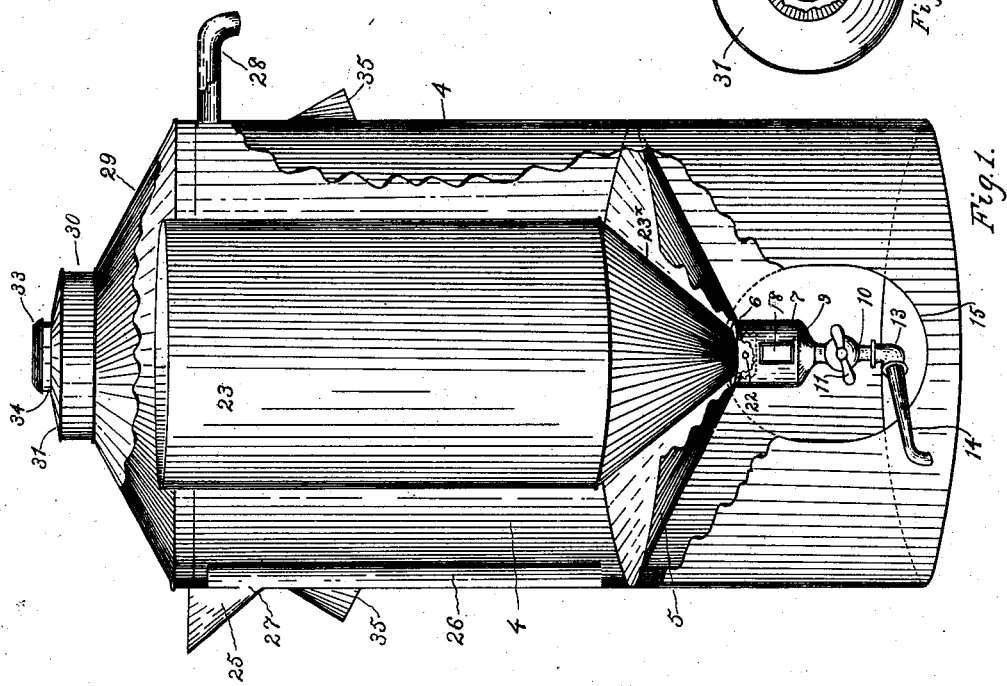
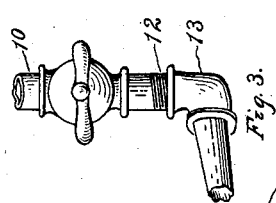

UNITED STATES PATENT OFFICE.

JAMES A. RECTOR, OF KANSAS CITY, KANSAS.

CREAM-SEPARATOR.

SPECIFICATION forming part of Letters Patent No. 737,139, dated August 25, 1903.

Application filed October 1, 1902. Serial No. 125,459. (No model.)

*To all whom it may concern:*

Be it known that I, JAMES A. RECTOR, a citizen of the United States of America, residing at Kansas City, in the county of Wyandotte and State of Kansas, have invented certain new and useful Improvements in Cream-Separators; and I do hereby declare that the following is a full, clear, and exact description of the invention, such as will enable others to make and use the same, reference being had to the accompanying drawings, forming a part of this specification.

The objects of my invention are, first, a separator in which the heat units are rapidly dispelled from the lacteal fluid and a uniform degree of cold maintained; second, to open communication between the fountain and the fluid-discharging conduit to the creaming-can for irrigation.

The invention consists in the novel construction and combination of parts, such as will be first fully described and specifically pointed out in the claims.

In the drawings, Figure 1 is a front view of the apparatus with a portion of the side, outer casing, and top broken away to show the artificial fountain-receptacle and the water-discharging creaming-can and the sight-tube, the valve, and the discharge-tube. Fig. 2 is an enlarged detail view of a broken portion of the cone-shaped bottom of the creaming-can and of the sight-tube broken from the rear of the can and tube and the side opposite to that seen in Fig. 1, showing the flanged threaded joint or coupling, the valve-opening leading to the sight-tube, and the transparent portion of the sight-tube. Fig. 3 is a detail view of the faucet-valve and spout. Fig. 4 is a detail view of the ventilating-cover to the fountain-receptacle.

Similar numerals of reference indicate corresponding parts in all the figures of the drawings.

Referring to the drawings, 4 represents a cylindrical shell or casing of the requisite height and circumference and open at each end. Within the casing 4, at a point about one-third the distance upwardly from the lower end of said casing, is the bottom to receptacle 4, formed by the concavo-convex plate 5, the outer edge of which plate is hermetically connected with the inner surface of the said casing, said plate inclining downwardly and provided at a point equidistant from its outer edge with an opening 6. Within the opening 6 is extended the upper end of the sight-tube 7, the sides of the opening 6 being hermetically connected with the outer surface of the tube. The tube 7 is of the requisite size, circumferentially, to receive a considerable quantity of the separated milk and is externally screw-threaded at 8, extending from the upper end of the tube downwardly about one-half the distance toward its lower end. The side of the sight-tube at its lower end is drawn inwardly at 9 and reduced in size, and with said reduced portion 9 is connected the upper end of a short tube 10, in which is a faucet-valve 11. The lower end of the tube 10 is externally screw-threaded at 12, and with said end is connected an elbow 13, and with said elbow is connected one end of a spout 14, the other end of which spout extends horizontally from the elbow in the direction of the side of the casing 4 and through the circular opening 15 in the side of the casing, which opening permits the spout to be moved laterally in position to accommodate the discharge of the fluid into separate contiguously-positioned receptacles. In the side of the sight-tube is an opening 16, rectangular in shape, extending from a position near the contracted lower end 9 upwardly about one-half of the distance toward the upper end of said tube, in the inner surface of which tube adjacent to the inner side of which opening is a rabbet 17, in which rabbet is a transparent plate 18, formed of glass and hermeitcally seated therein.

Within the sight-tube 7 is fitted an externally-screw-threaded valve-coupling or joint 19, upon the upper end of which is an outwardly-extended annular flange 20, and between the upper end of the tube 7 and said flange is a gasket 21, formed of rubber or other equivalent substance. In the side of the concentric tube-coupling or joint 19, a short distance below the flange 20, is an opening 22, which is opposite the inner surface of the tube 7.

23 represents the creaming-can, which is arranged within the receptacle 4 and which consists of a cylindrical vessel about one-half the size of the receptacle 4, the upper end of which extends a short distance above the upper end of the said receptacle. The bottom 23* of the creamery-can is conical or funnel-shaped, and in the lower portion or apex is an annular opening 24, the sides of which opening are connected hermetically with the upper surface of the flange 20 on the tube-coupling or valve-joint 19.

On the outer side of the receptacle 4 and near the upper end is a semicylindrical nose or cup 25 for the reception of the cold water, which communicates by the opening 27 with the upper end of a vertical tube 26, connected with the inner surface of the receptacle 4, the lower end of which tube extends downwardly nearly to the upper surface of the bottom 5 of the said receptacle. On the other side of the receptacle 4 to that having the nose or cup 25 is an overflow-pipe 28.

In the top of the receptacle 4 is a removable flanged cover 29, the surface of which cover inclines upwardly and covered with an annular neck 30, in which neck is fitted a small flanged cover 31, in the top of which cover is a screen 32. With said cover is connected a cap 33, which is above the screen 32 and connected therewith by upright straps 34.

35 35 are handles for the convenient transportation of the apparatus.

In the employment of the apparatus for the uses intended the valve 11 being closed and the creaming-can and its connections arranged in position, as seen in Fig. 1, the cover 29 is removed from the receptacle 4 and the lacteal fluid from which the cream is to be separated placed within the creaming-can. The cover 29 is then replaced and a constantly-flowing stream of cold water admitted to the nose 25, which passes downwardly through the tube 26 and into the space between the upper surfaces of the bottom 5 of the receptacle and the funnel-shaped surface of the bottom 23* of the creaming-can and a rotary movement of the water maintained, the force of the inflow being as rapid as the supply. The water within the receptacle 4 rises in height to the level of the overflow-tube 28 and passes out said tube and being supplied at a low degree of temperature the same degree of cold is constantly maintained around the bottom of the creaming-can. The heat of the lacteal fluid which is eliminated by the cold is taken up by the water, which acts as a heat-transmitting agent, and the water passes off through the overflow-pipe 28. The cream, which is in process of rising within the creamery-can, forms during the requisite time for separation from the milk and rises to the top of the can. As soon as this occurs the valve 11 is opened and the separated milk drawn off through the spout 14, this being conducted slowly until the cream is visible in the sight-tube 7 through the glass 18, when the discharge is cut off by the valve. The cream is then removed from the creaming-can through the spout 14 into another vessel. The cover 29 being removed from the receptacle 4, the creaming-can is then given a number of rotary movements, thus unscrewing the joint and until the flange 20 is moved upwardly from the gasket 21 and the valve-opening 22 in the tube-joint 19 raised above the line of the upper end of the sight-tube 7 and placed in communication with the interior of the receptacle 4, the water in which meshes rushes through said openings into the sight-tube, and the valve 11 being opened passes out of the spout 14, thereby irrigating the sight-tube and preparing the same for inspection and also cleansing the valve and spout.

Instead of cold water other heat-transmitting agents may be employed, the obvious advantage of the apparatus being such as to introduce the effective agency of a spring of cold water around the creaming-can, the water being conducted from any source and chilled artificially. The heat from the warm milk not taken up by the water passes through the screen 32 in the top 31 of the receptacle 4. With the employment of ice within the outer receptacle the apparatus may be employed for use as a water-cooler, its drinking condition being detected in the sight-tube, and such modifications as are within the scope of the invention may be employed.

Having fully described my invention, what I now claim as new, and desire to secure by Letters Patent, is—

1. In an apparatus for cooling liquids, an outer liquid-receptacle having an opening in the bottom thereof, and an internally-screw-threaded tube in said opening, an inner liquid-receptacle and an externally-screw-threaded, concentric tube-joint or coupling connected with said tube and having an opening adapted to be brought into communication with said outer receptacle in the upward movement of said inner receptacle.

2. In an apparatus for cooling liquids, an outer liquid-receptacle having an opening in the bottom thereof, and an internally-screw-threaded tube in said opening, an inner liquid-receptacle having a discharge-opening, and an externally-screw-threaded, concentric tube-joint or coupling connected with said tube, an outwardly-extended, annular flange on said tube-joint with which the sides of the opening in the bottom of said inner receptacle are connected, said tube-joint having an opening below the said flange for the discharge of the fluid from the outer receptacle, and a gasket between said flange and the upper end of said tube in the bottom of the outer receptacle.

3. In a cream-separating apparatus, an outer receptacle or case and a bottom having a concave inner surface, and a liquid-discharge opening in said bottom, an internally-screw-threaded sight-tube within said opening, a tube connected with the sight-tube, a valve in said tube, an externally-screw-threaded tube-joint within the sight-tube, a creaming-can within the outer vessel, and a bottom thereto, having inwardly and downwardly extended inner and outer surfaces and an opening in said bottom, the sides of which are connected with the said tube-joint, said joint having an opening communicating with the outer receptacle when the can is moved upwardly, and a supply-pipe for the cold water on the inner side of said outer receptacle terminating in proximity to the concave surface of the bottom of said outer receptacle.

JAMES A. RECTOR.

Witnesses:
 FRANCIS A. LEACH,
 HOMER K. PEYTON.